US012719197B2

(12) United States Patent
Nishitani

(10) Patent No.: US 12,719,197 B2
(45) Date of Patent: Aug. 25, 2026

(54) CONNECTOR WITH HOOKING PORTIONS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Akihiro Nishitani, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 303 days.

(21) Appl. No.: 18/280,428

(22) PCT Filed: Feb. 15, 2022

(86) PCT No.: PCT/JP2022/005780
§ 371 (c)(1),
(2) Date: Sep. 5, 2023

(87) PCT Pub. No.: WO2022/190781
PCT Pub. Date: Sep. 15, 2022

(65) Prior Publication Data

US 2024/0145974 A1 May 2, 2024

(30) Foreign Application Priority Data

Mar. 8, 2021 (JP) ................................ 2021-036039

(51) Int. Cl.
*H01R 13/627* (2006.01)
*H01R 13/428* (2006.01)

(52) U.S. Cl.
CPC ....... *H01R 13/428* (2013.01); *H01R 13/6272* (2013.01)

(58) Field of Classification Search
CPC .............. H01R 13/428; H01R 13/6272; H01R 13/4223; H01R 13/4226; H01R 13/4362; H01R 13/514; H01R 9/2416
See application file for complete search history.

(56) References Cited

U.S. PATENT DOCUMENTS 4,368,939 A * 1/1983 Foederer ................ H01R 24/76 439/594
5,201,674 A * 4/1993 Okura ................ H01R 13/4361 439/594

(Continued)

FOREIGN PATENT DOCUMENTS

JP S60-138266 U1 9/1985
JP 2005-339867 A 12/2005
JP 2008-130285 A 6/2008

OTHER PUBLICATIONS

International Search Report issued on Mar. 22, 2022 for WO 2022/190781 A1 (4 pages).

*Primary Examiner* — Thanh Tam T Le
(74) *Attorney, Agent, or Firm* — Venjuris, P.C.

(57) ABSTRACT

It is aimed to prevent the expansion of a connector housing sandwiching and holding a terminal fitting. A connector is provided with a terminal fitting (10) fixed to a wire (14) and a connector housing (20) for sandwiching and holding the terminal fitting (10) between an upper housing (30) and a lower housing (40). The upper housing (30) and the lower housing (40) are assembled by being slid in a direction intersecting a sandwiching direction of the terminal fitting (10). The upper housing (30) and the lower housing (40) are formed with hooking portions (34, 43, 51, 52, 55, 56) to be (Continued)

hooked to each other in a non-resilient state in the sandwiching direction of the terminal fitting (10).

5 Claims, 6 Drawing Sheets

(56) References Cited

U.S. PATENT DOCUMENTS

| | | | | |
|---|---|---|---|---|
| 5,688,148 | A | 11/1997 | Hatagishi et al. | |
| 6,045,409 | A * | 4/2000 | Abe | H01R 13/502 439/701 |
| 6,068,522 | A * | 5/2000 | Aoyama | H01R 13/506 439/701 |
| 6,165,012 | A * | 12/2000 | Abe | H01R 4/2433 439/465 |
| 6,319,071 | B1 * | 11/2001 | Sato | H01R 4/185 439/701 |
| 6,354,887 | B2 * | 3/2002 | Maeda | H01R 13/514 439/701 |
| 6,409,551 | B1 * | 6/2002 | Nagai | H01R 13/6275 439/701 |
| 6,537,080 | B2 * | 3/2003 | Sato | H01R 9/226 439/43 |
| 6,773,309 | B1 * | 8/2004 | Shuey | H01R 13/4365 439/701 |
| 6,860,767 | B2 * | 3/2005 | Takahashi | H01R 13/4365 439/752 |
| 6,893,292 | B2 * | 5/2005 | Yamamoto | H01R 13/6272 439/701 |
| 7,014,505 | B1 * | 3/2006 | Tanaka | H01R 13/4362 439/595 |
| 7,695,315 | B2 * | 4/2010 | Hitchcock | H01R 13/4223 439/701 |
| 7,841,913 | B2 * | 11/2010 | Hitchcock | H01R 13/506 439/701 |
| 10,389,062 | B2 * | 8/2019 | Zebhauser | H01R 13/6463 |
| 11,139,624 | B2 * | 10/2021 | Miyamura | H01R 24/64 |
| 11,404,814 | B2 * | 8/2022 | Oka | H01R 13/514 |
| 12,237,607 | B2 * | 2/2025 | Kobayashi | H01R 13/28 |
| 2013/0130562 | A1 | 5/2013 | Shinkawa et al. | |
| 2017/0005429 | A1 | 1/2017 | Tai et al. | |

* cited by examiner

CONNECTOR WITH HOOKING PORTIONS

CROSS REFERENCE TO RELATED APPLICATIONS

This application is a national phase of PCT application No. PCT/JP2022/005780, filed on 15 Feb. 2022, which claims priority from Japanese patent application No. 2021-036039, filed on 8 Mar. 2021, all of which are incorporated herein by reference.

TECHNICAL FIELD

The present disclosure relates to a connector.

BACKGROUND

Patent Document 1 discloses a connector in which a terminal fitting is inserted into a terminal accommodation chamber formed in a connector housing and retained by a flexible locking piece formed in the terminal accommodation chamber. In the process of inserting the terminal fitting into the terminal accommodation chamber, the flexible locking piece pushed by the terminal fitting is deflected in a direction intersecting an inserting direction of the terminal fitting. If the insertion of the terminal fitting is completed, the flexible locking piece resiliently returns and locks the terminal fitting. In the connector housing, a deflection space for the deflection of the flexible locking piece is secured in addition to an accommodation space for arranging the flexible locking piece in an undeflected state. Thus, the above connector is enlarged in the direction intersecting the inserting direction of the terminal fitting.

PRIOR ART DOCUMENT

Patent Document

Patent Document 1: JP 2012-049081 A

SUMMARY OF THE INVENTION

Problems to be Solved

As a means for height reduction, a structure is considered which holds the terminal fitting in the connector housing by sandwiching the terminal fitting between a lower housing and an upper housing constituting the connector housing and holding the lower housing and the upper housing in a united state by a resilient locking piece. According to this configuration, a locking lance can be eliminated. However, in the case of this structure, there is a concern that the lower housing and the upper housing are expanded and separated and the resilient locking piece is disengaged if a wire led out from the connector housing is pulled in an overlapping direction of the lower housing and the upper housing.

A connector of the present disclosure was completed on the basis of the above situation and aims to prevent the expansion of a connector housing sandwiching and holding a terminal fitting.

Means to Solve the Problem

The present disclosure is directed to a connector with a terminal fitting fixed to a wire and a connector housing for sandwiching and holding the terminal fitting between an upper housing and a lower housing, the upper housing and the lower housing being assembled by being slid in a direction intersecting a sandwiching direction of the terminal fitting, and the upper housing and the lower housing being formed with hooking portions to be hooked to each other in a resiliently undeformed state in the sandwiching direction of the terminal fitting.

Effect of the Invention

According to the present disclosure, it is possible to prevent the expansion of a connector housing sandwiching and holding a terminal fitting.

DETAILED DESCRIPTION TO EXECUTE THE INVENTION

Description of Embodiments of Present Disclosure

Figure 1:
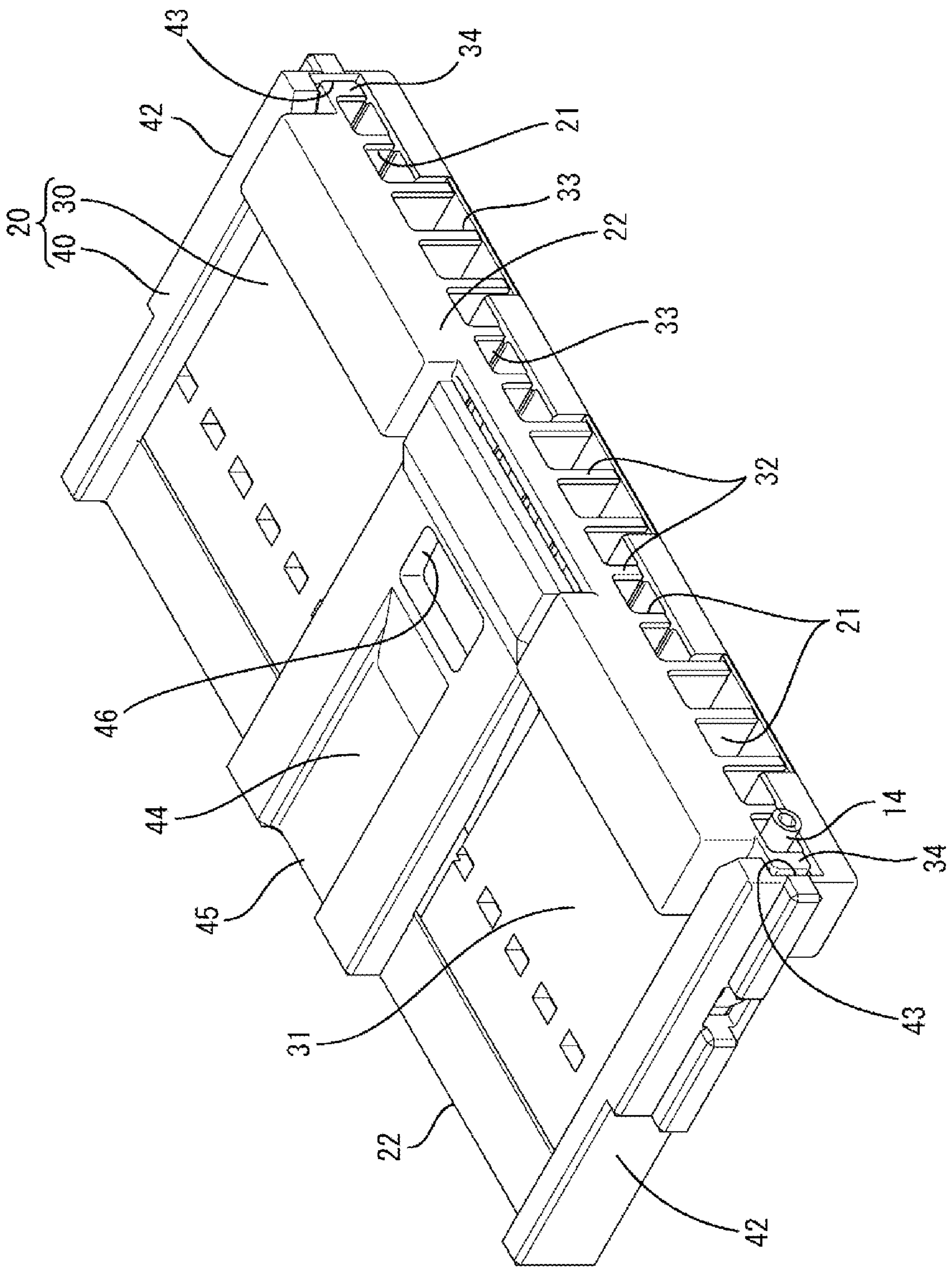
FIG. 1 is a perspective view of a connector of one embodiment when viewed obliquely from an upper-rear side.
Figure 2:
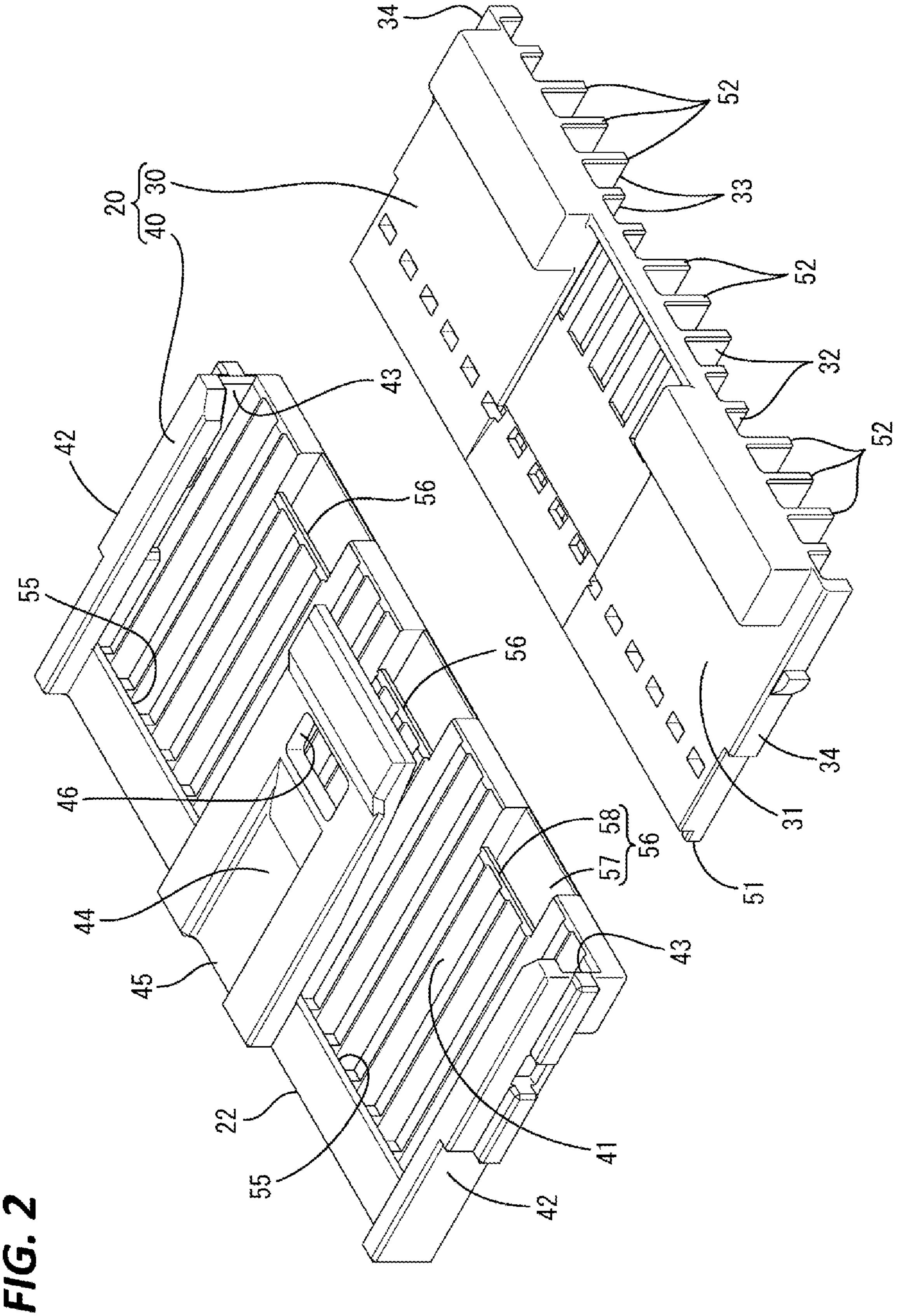
FIG. 2 is a perspective view when viewed obliquely from the upper-rear side showing a state where a connector housing is separated into an upper housing and a lower housing.

First, embodiments of the present disclosure are listed and described.

(1) The connector of the present disclosure is provided with a terminal fitting fixed to a wire and a connector housing for sandwiching and holding the terminal fitting between an upper housing and a lower housing, the upper housing and the lower housing being assembled by being slid in a direction intersecting a sandwiching direction of the terminal fitting, and the upper housing and the lower housing being formed with hooking portions to be hooked to each other in a resiliently undeformed state in the sandwiching direction of the terminal fitting. According to this configuration, the hooking portions of the upper housing and the hooking portions of the lower housing are high in rigidity since being structured to hook without being resiliently deformed. Thus, even if a force acts on the upper housing and the lower housing in a direction to release the sandwiched terminal fitting by the wire being pulled, the expansion of the upper housing and the lower housing can be prevented.

(2) Preferably, the wire is led out rearward from a rear end of the connector housing, and the hooking portions are arranged on rear end parts of the lower housing and the upper housing. When the wire is pulled, a force from the wire directly acts on the rear end parts of the lower housing and the upper housing. According to the present disclosure, since the hooking portions are arranged on the rear end parts of the lower housing and the upper housing, the expansion of the lower housing and the upper housing can be effectively prevented.

(3) Preferably, the upper housing includes a plurality of terminal accommodation chambers for accommodating a plurality of the terminal fittings in parallel, and the hooking portions include a rear projection formed on a rear end part of a separation wall portion partitioning between adjacent ones of the terminal accommodation chambers. According to this configuration, the shape of the upper housing can be simplified as compared to the case where the rear projection projects from a part different from the separation wall portion.

(4) In (3), the hooking portions of the lower housing may include rear recesses, and a plurality of the rear projections may be accommodated into one rear recess. According to this configuration, the shape of the lower housing can be simplified as compared to the case where the plurality of rear projections are individually accommodated into a plurality of the recess recesses.

(5) Preferably, a plurality of the terminal fittings are accommodated in parallel in a width direction in the connector housing, the hooking portions of the lower housing include groove portions formed in both end parts in a parallel direction of the plurality of terminal fittings, and the hooking portions of the upper housing include side edge parts of the upper housing. According to this configuration, the expansion of the side edge parts of the upper housing and the lower housing can be prevented.

(6) Preferably, the hooking portions of the upper housing include a front projection projecting forward in a front end part of the upper housing, and the hooking portions of the lower housing include a front recess to be fit to the front projection. According to this configuration, the inclination of the upper housing and the lower housing can be suppressed and, consequently, the expansion of the upper housing and the lower housing can be prevented by the fitting of the front projection and the front recess.

(7) Preferably, in (6), the upper housing includes a plurality of terminal accommodation chambers for accommodating a plurality of the terminal fittings in parallel, and the front projection is formed on a front end part of a separation wall portion partitioning between adjacent ones of the terminal accommodation chambers. According to this configuration, the shape of the upper housing can be simplified as compared to the case where the front projection projects from a part other than the separation wall portion.

DETAILS OF EMBODIMENT OF PRESENT DISCLOSURE

Embodiment

Figure 3:
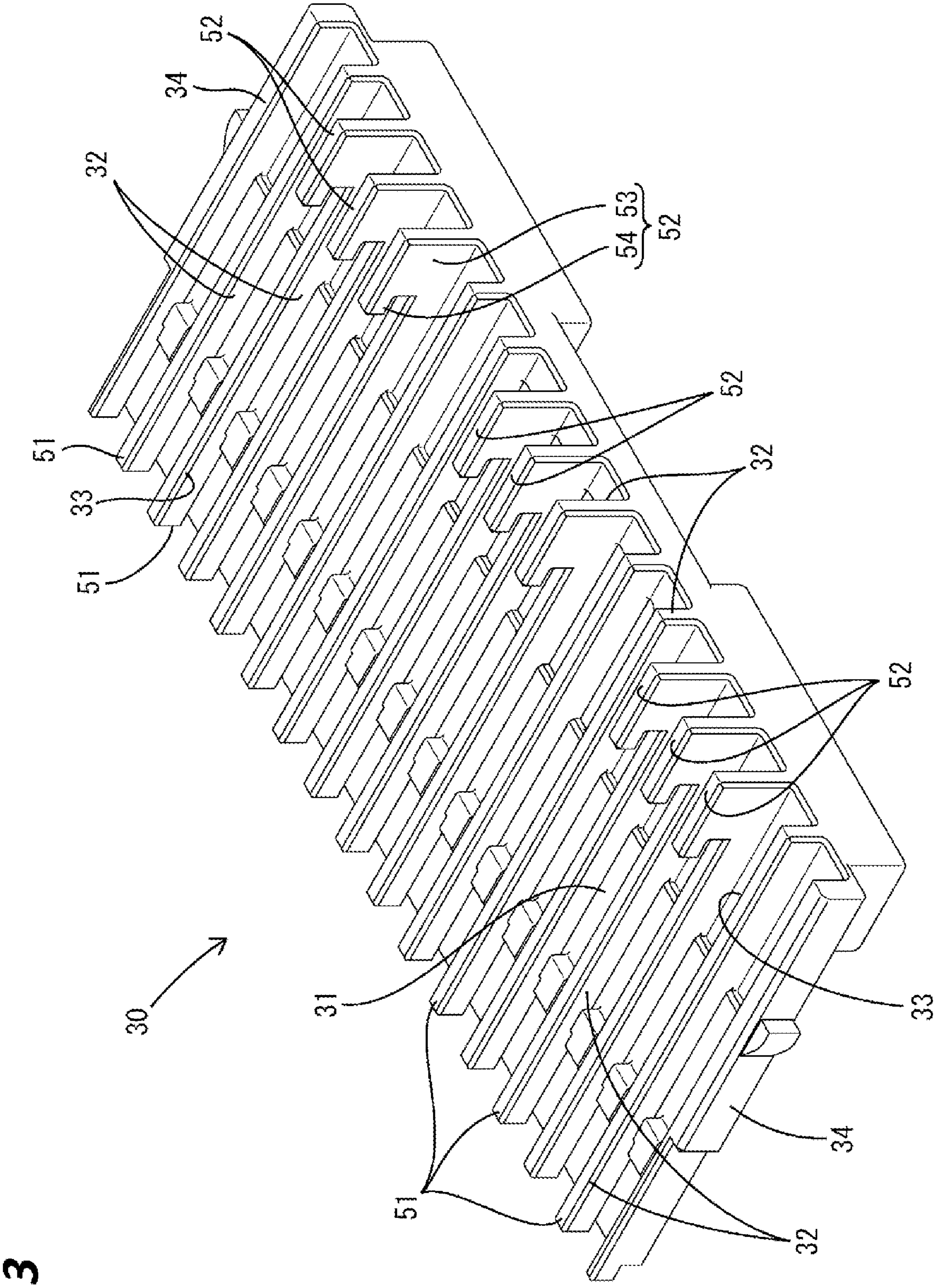
FIG. 3 is a perspective view of the upper housing in a vertically inverted state.
Figure 4:
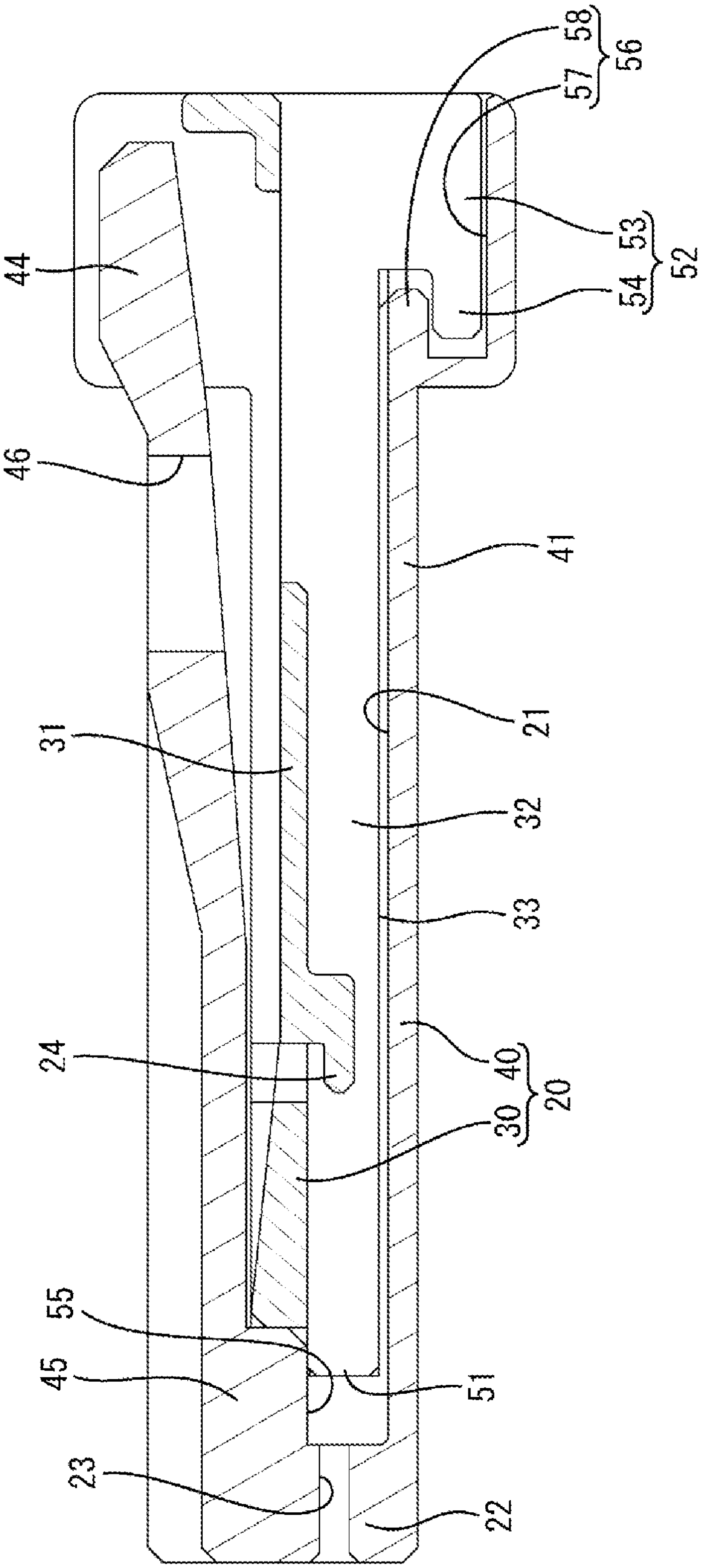
FIG. 4 is a side view in section of the connector housing.
Figure 5:
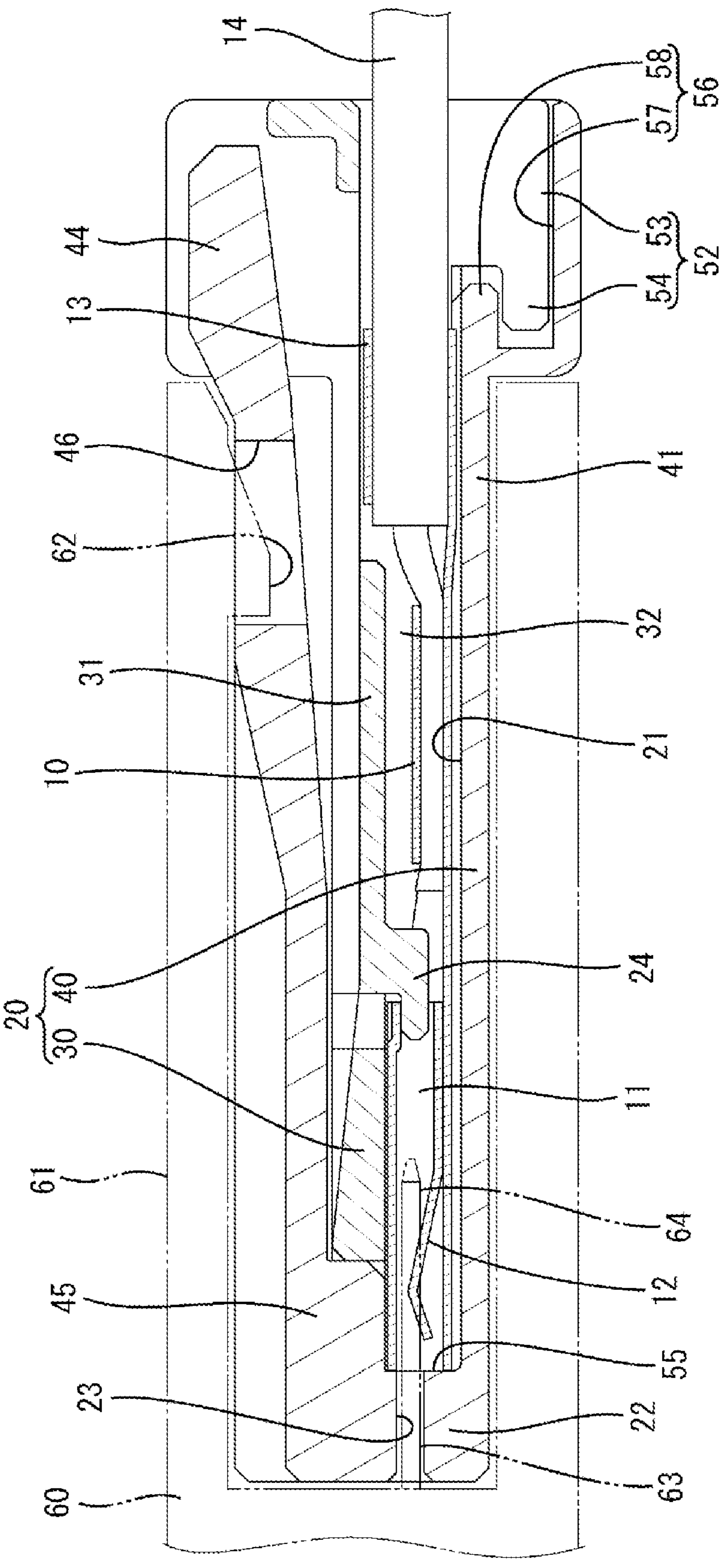
FIG. 5 is a side view in section of the connector.
Figure 6:
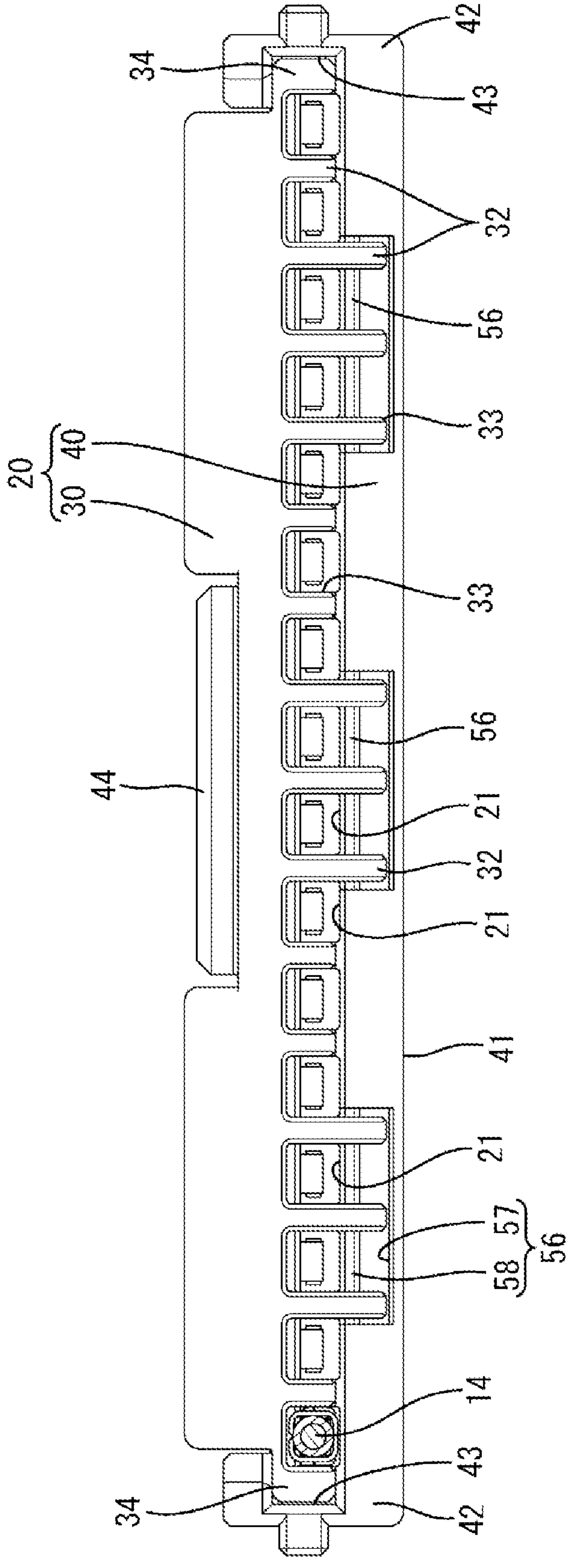
FIG. 6 is a back view of the connector.

One specific embodiment of a connector of the present disclosure is described below with reference to FIGS. 1 to 6. Note that the present invention is not limited to these illustrations, but is represented by claims and intended to include all changes in the scope of claims and in the meaning and scope of equivalents. In this embodiment, an oblique left-upper side in FIGS. 1 to 3 and a left side in FIGS. 4, 5 are defined as a front side concerning a front-rear direction. Upper and lower sides shown in FIGS. 1 to 6 are directly defined as upper and lower sides concerning a vertical direction. The vertical direction and a height direction are used as synonyms. A lateral direction and a width direction are used as synonyms.

The connector of this embodiment is provided with a plurality of terminal fittings 10 and one connector housing 20. The terminal fitting 10 is a female terminal having a shape elongated in the front-rear direction. As shown in FIG. 5, a rectangular tube portion 11 open on both front and rear ends is formed in a front end part of the terminal fitting 10. A resilient contact piece 12 is accommodated in the rectangular tube portion 11. A crimping portion 13 in the form of an open barrel is formed in a rear end part of the terminal fitting 10. The crimping portion 13 is fixed to a front end part of a wire 14. The terminal fitting 10 and the front end part of the wire 14 are arranged one behind the other, and the wire 14 extends rearward from the rear end of the terminal fitting 10.

As shown in FIG. 1, the connector housing 20 has a flat rectangular parallelepiped shape as a whole. That is, a vertical dimension of the connector housing 20 is smaller than dimensions in the front-rear direction and width direction of the connector housing 20. As shown in FIG. 5, the connector housing 20 is fit into a receptacle 61 of a mating connector 60. A lock projection 62 is formed on a lower wall portion of the receptacle 61. The mating connector 60 includes male terminals 63 to be connected to the terminal fittings 10. A tab 64 of the male terminal 63 is accommodated in the receptacle 61.

A plurality of terminal accommodation chambers 21 elongated in the front-rear direction are formed in the connector housing 20. The plurality of terminal accommodation chambers 21 are arranged in parallel at fixed intervals in the width direction, i.e. a direction intersecting an arrangement direction of the terminal fitting 10 and the wire 14. As shown in FIGS. 4 and 5, the connector housing 20 includes a front wall portion 22 defining the front ends of the terminal accommodation chambers 21. The front wall portion 22 is formed with a plurality of insertion holes 23 for allowing the respective terminal accommodation chambers 21 to individually communicate with the outside of the connector housing 20. The tab 64 is inserted into the insertion hole 23. A retaining portion 24 is formed in each terminal accommodation chamber 21.

The connector housing 20 is configured by assembling the upper housing 30 made of synthetic resin and a lower housing 40 likewise made of synthetic resin. An assembling direction of the upper housing 30 and the lower housing 40 is the vertical direction intersecting both the front-rear direction, in which the terminal fitting 10 and the wire 14 are arranged, and the width direction, in which the plurality of terminal fittings 10 are arranged. The upper housing 30 and the lower housing 40 are united to sandwich the plurality of terminal fittings 10. The wires 14 are led out rearward to outside from the rear ends of the upper housing 30 and the lower housing 40.

The upper housing 30 is a single component including a base plate portion 31 having a rectangular plan view shape when the upper housing 30 is viewed from above and a plurality of separation wall portions 32 projecting downward from the lower surface of the base plate portion 31. The base plate portion 31 and the plurality of separation wall portions 32 constitute the plurality of terminal accommodation chambers 21. As shown in FIG. 3 showing the vertically inverted upper housing 30, the plurality of separation wall portions 32 are elongated in the front-rear direction and arranged at fixed intervals in the width direction. The separation wall portion 32 partitions between the terminal accommodation chambers 21 adjacent in the width direction. A plurality of openings 33 for allowing the respective terminal accommodation chambers 21 to communicate with outside below the upper housing 30 are formed in the lower surface of the upper housing 30. A pair of left and right guide ribs 34 are formed on both side edge parts in the width direction of the upper housing 30. The guide ribs 34 extend in a direction parallel to the arrangement direction of the terminal fitting 10 and the wire 14, i.e. in the front-rear direction.

The lower housing 40 is a single component including a closing plate portion 41 having a rectangular plan view shape when the lower housing 40 is viewed from above, the front wall portion 22, a pair of left and right side wall portions 42 and a lock arm 44. The front wall portion 22 is shaped to project upward from the front end edge of the closing plate portion 41 over an entire width. The side wall portions 42 are shaped to project upward from both left and right side edge parts of the closing plate portion 41. Groove portions 43 extending in the front-rear direction are formed in the inner side surfaces of the side wall portions 42.

The lock arm 44 is a plate-like part cantilevered rearward from a widthwise central part of the front wall portion 22. The lock arm 44 is arranged to face the upper surface of the closing plate portion 41 across an interval. The lock arm 44 is formed with a lock hole 46. The lock arm 44 can be resiliently displaced in the vertical direction toward and away from the closing plate portion 41 with a supporting portion 45 connected to the front wall portion 22 as a fulcrum.

The connector housing 20 accommodates the plurality of terminal fittings 10 while vertically sandwiching the plurality of terminal fittings 10 between the upper housing 30 and the lower housing 40. The connector housing 20 has a flat shape having a larger dimension in the width direction, which is the arrangement direction of the terminal fittings 10, than a dimension in the vertical direction. Thus, if the wire 14 is pulled upward or downward, there is a concern that the upper housing 30 and the lower housing 40 are relatively displaced to be expanded in directions opposite to directions to sandwich the terminal fittings 10. As a countermeasure against that, the connector housing 20 is provided with hooking portions 34, 43, 51, 53, 55 and 56 described below.

The hooking portions include a plurality of front projections 51, a plurality of front recesses 55, a plurality of rear projections 52, a plurality of rear recesses 56, the pair of guide ribs 34 and the pair of groove portions 43. The front projections 51, the rear projections 52 and the guide ribs 34 are formed on the upper housing 30. The front recesses 55, the rear recesses 56 and the groove portions 43 are formed in the lower housing 40.

The plurality of front projections 51 are individually formed on front end parts of all the separation wall portions 32. The front projections 51 project further forward than the front end of the base plate portion 31. The plurality of rear projections 52 are formed only on some separation wall portions 32 and arranged on rear end parts of the separation wall portions 32. The separation wall portions 32 formed with the rear projections 52 are only three separation wall portions 32 arranged in a widthwise central part and three separation wall portions 32 arranged at positions near each of both widthwise ends. The rear projections 52 project from the lower ends of the separation wall portions 32 in a direction opposite to the base plate portion 31, i.e. downward. The rear projection 52 includes a base portion 53 directly connected to the separation wall portion 32 and a projecting portion 54 projecting forward from the base portion 53. The projecting portion 54 is spaced apart from the lower end edge of the separation wall portion 32. The pair of guide ribs 34 are arranged on both end parts in the width direction of the upper housing 30, i.e. at positions sandwiching the front projections 51 and the rear projections 52 from both left and right sides.

The plurality of front recesses 55 are formed by recessing the rear surface of the front wall portion 22 at a plurality of positions. Each front recess 55 constitutes a front end part of the terminal accommodation chamber 21. The plurality of rear recesses 56 are formed in a rear end part of the closing plate portion 41. The rear recesses 56 are formed at three positions in a widthwise central part of the closing plate portion 41 and near both ends in the width direction. The rear recess 56 includes an accommodating portion 57 formed by recessing the upper surface of the closing plate portion 41 and a locking portion 58 projecting rearward in an eaves-like manner from a front end part of the accommodating portion 57. The locking portion 58 is arranged apart from the bottom surface of the accommodating portion 57. The pair of groove portions 43 are arranged in both end parts in the width direction of the lower housing 40, i.e. at positions sandwiching the front recesses 55 and the rear recesses 55 from both left and right sides.

Next, an assembling procedure of the connector is described. First, the upper housing 30 is vertically inverted and the terminal fittings 10 are accommodated into the terminal accommodation chambers 21 through the openings 33. If the terminal fitting 10 accommodated into the terminal accommodation chamber 21 is slid rearward, the retaining portion 24 locks a rear end part of the rectangular tube portion 11 from behind. By this locking, the terminal fitting 10 is restricted from relatively moving rearward, i.e. toward the wire 14, with respect to the upper housing 30. In the above way, the terminal fitting 10 is held positioned in the terminal accommodation chamber 21. A front end part of the rectangular tube portion 11 of the terminal fitting 10 projects further forward than the front end edge of the base plate portion 31.

After the terminal fittings 10 are mounted into the upper housing 30, the lower housing 40 and the upper housing 30 are assembled to configure the connector housing 20. When the upper housing 30 and the lower housing 40 are assembled, the groove portions 43 of the lower housing 40 are fit to the guide ribs 34 of the upper housing 30 from front and the upper housing 30 and the lower housing 30 are slid. An assembling direction of the upper housing 30 and the lower housing 40 is a direction orthogonal to both the front-rear direction, which is the arrangement direction of the terminal fitting 10 and the wire 14, and the width direction, which is a parallel direction of the plurality of terminal fittings 10.

With the upper housing 30 and the lower housing 40 assembled, all the openings 33 of the upper housing 30 are closed by the closing plate portion 41, the terminal accommodation chambers 21 are defined over the entire peripheries and the terminal fittings 10 are held accommodated in the terminal accommodation chambers 21. The front end parts of the rectangular tube portions 11 of the terminal fittings 10 and the front projections 51 of the front end parts of the separation wall portions 32 are fit into the front recesses 55 of the front wall portion 22 of the lower housing 40. The base portions 53 of the rear projections 52 are accommodated into the accommodating portions 57 of the rear recesses 56, and the projecting portions 54 of the rear projections 52 lock the locking portions 58 of the rear recesses 56 from below. The wires 14 are led out rearward from the connector housing 20.

The base plate portion 31 of the upper housing 30 and the closing plate portion 41 of the lower housing 40 are arranged to sandwich the terminal fittings 10 in the vertical direction. The lock arm 44 is arranged to overlap the outer surface of the base plate portion 31. The upper housing 30 is sandwiched in the vertical direction between the entire closing plate portion 41 and the supporting portion 45 of the lock arm 44. In above way, the assembling of the connector housing 20, the mounting of the terminal fittings 10 into the connector housing 20 and the manufacturing of the connector are completed.

In connecting the connector to the mating connector 60, the connector housing 20 is fit into the receptacle 61 of the mating connector 60. In the process of fitting the connector housing 20 and the receptacle 61, the lock arm 44 is resiliently displaced in a direction approaching the base plate portion 31 due to interference with the lock projection 62. When the connector housing 20 and the receptacle 61 are properly fit, the lock arm 44 resiliently returns and the lock hole 46 and the lock projection 62 are fit. By the fitting of the lock hole 46 and the lock projection 62, the connector housing 20 and the mating connector 60 are locked in the connected state.

If the wire 14 led rearward to the outside of the connector housing 20 is pulled in the vertical direction, a tensile force to the wire 14 also acts on the terminal fitting 10. Thus, a force acting in a direction separating from the mating housing, i.e. acting upward or downward, acts on one of the upper housing 30 and the lower housing 40.

However, since the projecting portions 54 of the rear projections 52 of the upper housing 30 and the locking portions 58 of the rear recesses 56 of the lower housing 40 are hooked to each other, rear end parts of the upper housing 30 and the lower housing 40 are not separated in the vertical direction. Since the front projections 51 of the upper housing 30 are fit to the front recesses 55 of the lower housing 40, front end parts of the upper housing 30 and the lower housing 40 are also not separated in the vertical direction.

Since the guide ribs 34 projecting laterally to the upper housing 30 are fit in the groove portions 43 open on lateral sides of the lower housing 40, the front end parts of the upper housing 30 and the lower housing 40 are not separated in the vertical direction and the upper housing 30 and the lower housing 40 are not relatively displaced to incline in the front-rear direction. Since the front end part of the upper housing 30 is vertically sandwiched between the closing plate portion 41 of the lower housing 40 and the lock arm 44, the front end parts of the upper housing 30 and the lower housing 40 are not separated in the vertical direction.

In the above way, even if a tensile force acts on the wire 14 in the vertical direction, expansion displacements of the upper housing 30 and the lower housing 40 are prevented and the terminal fitting 10 is held accommodated in the connector housing 20.

The connector of this embodiment is provided with the terminal fittings 10 fixed to the wires 14 and the connector housing 20 for accommodating the terminal fittings 10. The connector housing 20 sandwiches and holds the terminal fittings 10 between the upper housing 30 and the lower housing 40. The upper housing 30 and the lower housing 40 are assembled by being slid in the front-rear direction intersecting a sandwiching direction of the terminal fittings 10. The upper housing 30 and the lower housing 40 are formed with the hooking portions 34, 43, 51, 52, 55 and 56 to be hooked to each other in a non-resilient state (resiliently undeformed state) in the vertical direction sandwiching the terminal fittings 10.

The front projections 51, the rear projections 52 and the guide ribs 34, which are the hooking portions of the upper housing 30, and the front recesses 55, the rear recesses 56 and the groove portions 43, which are the hooking portions of the lower housing 40, are high in rigidity since being structured to hook without being resiliently deformed. Thus, even if an external force acts on the upper housing 30 and the lower housing 40 in a direction to release the sandwiched terminal fittings 10 by the wire 14 being vertically pulled, the expansion of the upper housing 30 and the lower housing 40 can be prevented.

The wires 14 are led out rearward from the rear end of the connector housing 20. When the wire 14 is pulled, an external force from the wire 14 directly acts on the rear end parts of the upper housing 30 and the lower housing 40. Accordingly, the rear projections 52 and the rear recesses 56, which are the hooking portions, are arranged on the rear end parts of the upper housing 30 and the lower housing 40. In this way, the expansion of the upper housing 30 and the lower housing 40 can be effectively prevented.

The upper housing 30 includes the plurality of terminal accommodation chambers 21 for accommodating the plurality of terminal fittings 10 in parallel. The hooking portions include the rear projections 52 formed on the rear end parts of the separation wall portions 32 partitioning between adjacent ones of the terminal accommodation chambers 21. According to this configuration, the shape of the upper housing 30 can be simplified as compared to the case where the rear projections 52 project from parts different from the separation wall portions 32. The hooking portions of the lower housing 40 include the rear recesses 56 formed in the rear end part of the lower housing 40. A plurality of the rear projections 52 are accommodated in one rear recess 56. According to this configuration, the shape of the lower housing 40 can be simplified as compared to the case where the plurality of rear projections 52 are individually accommodated in the plurality of rear recesses 56.

The plurality of terminal fittings 10 are accommodated in parallel in the width direction in the connector housing 20. The hooking portions of the lower housing 40 include the pair of groove portions 43 formed in the both end parts in the width direction, which is the parallel direction of the plurality of terminal fittings 10. The hooking portions of the upper housing 30 include the guide ribs 34 formed on the side edge parts of the upper housing 30. According to this configuration, the expansion of the side edge parts of the upper housing 30 and the lower housing 40 can be prevented.

The guide ribs 34 and the groove portions 43 also have a function as guides when the upper housing 30 and the lower housing 40 are slid and assembled in addition to a function as the hooking portions. The shapes of the upper housing 30 and the lower housing 40 can be simplified as compared to the case where guide function parts are provided separately from the hooking portions.

The hooking portions of the upper housing 30 include the front projections 51 projecting forward in the front end part of the upper housing 30. The hooking portions of the lower housing 40 include the front recesses 55 to be fit to the front projections 51. According to this configuration, the inclination of the upper housing 30 and the lower housing 40 can be suppressed and, consequently, the expansion of the upper housing 30 and the lower housing 40 can be prevented by the fitting of the front projections 51 and the front recesses 55.

The upper housing 30 includes the plurality of terminal accommodation chambers 21 for accommodating the plurality of terminal fittings 10 in parallel. The front projections 51 are formed on the front end parts of the separation wall portions 32 partitioning between adjacent ones of the terminal accommodation chambers 21. According to this configuration, the shape of the upper housing 30 can be simplified as compared to the case where the front projections 51 project from parts different from the separation wall portions 32.

OTHER EMBODIMENTS

The present invention is not limited to the above described and illustrated embodiment, but is represented by claims. The present invention is intended to include all changes in the scope of claims and in the meaning and scope of equivalents and also include the following embodiments.

Although the assembling direction of the upper housing and the lower housing is the front-rear direction, which is the arrangement direction of the terminal fitting and the wire, in the above embodiment, the assembling direction of the upper housing and the lower housing may be the width direction orthogonal to the arrangement direction of the terminal fitting and the wire.

Although the front projections are formed on the front end parts of the separation wall portions in the above embodiment, the front projections may project from parts different from the separation wall portions.

Although the rear projections are formed on the rear end parts of the separation wall portions in the above embodiment, the rear projections may project from parts different from the separation wall portions.

Although the plurality of rear projections are accommodated into one rear recess in the above embodiment, only one rear projection may be accommodated into one rear recess.

LIST OF REFERENCE NUMERALS

10 . . . terminal fitting
11 . . . rectangular tube portion
12 . . . resilient contact piece
13 . . . crimping portion
14 . . . wire
20 . . . connector housing
21 . . . terminal accommodation chamber
22 . . . front wall portion
23 . . . insertion hole
24 . . . retaining portion
30 . . . upper housing
31 . . . base plate portion
32 . . . separation wall portion
33 . . . opening
34 . . . guide rib (hooking portion)
40 . . . lower housing
41 . . . closing plate portion
42 . . . side wall portion
43 . . . groove portion (hooking portion)
44 . . . lock arm
45 . . . supporting portion
46 . . . lock hole
51 . . . front projection (hooking portion)
52 . . . rear projection (hooking portion)
53 . . . base portion
54 . . . projecting portion
55 . . . front recess (hooking portion)
56 . . . rear recess (hooking portion)
57 . . . accommodating portion
58 . . . locking portion
60 . . . mating connector
61 . . . receptacle
62 . . . lock projection
63 . . . male terminal
64 . . . tab

What is claimed is:

1. A connector, comprising:
a plurality of terminal fittings each fixed to a wire; and
a connector housing for sandwiching and holding the terminal fittings between an upper housing and a lower housing,
the upper housing and the lower housing being assembled by being slid in a direction intersecting a sandwiching direction of the terminal fittings, and
the upper housing and the lower housing being formed with hooking portions to be hooked to each other in a resiliently undeformed state in the sandwiching direction of the terminal fittings,
wherein the wires are led out rearward from a rear end of the connector housing,
the upper housing includes a plurality of terminal accommodation chambers for accommodating the plurality of terminal fittings in parallel,
the hooking portions of the upper housing include rear projections formed on rear end portions of separation wall portions each partitioning between adjacent ones of the terminal accommodation chambers,
at least one of the hooking portions of the lower housing includes at least one rear recess to which the rear projections are hooked, and
the rear projections are accommodated and hooked to the at least one rear recess.

2. The connector of claim 1, wherein:
the plurality of terminal fittings are accommodated in parallel in a width direction in the connector housing,
the hooking portions of the lower housing include groove portions formed in both end portions in a parallel direction of the plurality of terminal fittings, and
the hooking portions of the upper housing include guide ribs to be fit to the groove portions.

3. The connector of claim 1, wherein:
the hooking portions of the upper housing include front projections projecting forward in a front end portion of the upper housing, and
the hooking portions of the lower housing include front recesses to be fit to the front projections.

4. The connector of claim 3, wherein:
the upper housing includes the plurality of terminal accommodation chambers for accommodating the plurality of terminal fittings in parallel, and
the front projections are formed on front end portions of the separation wall portions each partitioning between adjacent ones of the terminal accommodation chambers.

5. The connector of claim 2, wherein:
the rear projections are disposed between the guide ribs in the parallel direction, and
the at least one rear recess includes at least one locking portion to lock the rear projections such that separation of the upper housing and the lower housing in the sandwiching direction is suppressed.

* * * * *